Figure 1:
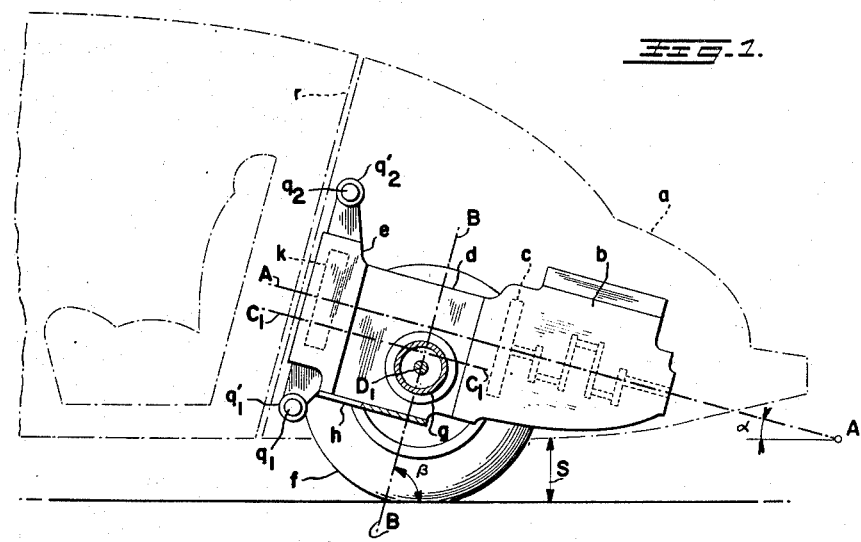

March 12, 1957   B. BARENYI   2,784,794
ARRANGEMENT OF THE DRIVE ASSEMBLIES IN AUTOMOTIVE VEHICLES
Filed May 10, 1951   2 Sheets-Sheet 1

INVENTOR
Bela Barenyi

BY Dicke and Padlon

ATTORNEYS.

March 12, 1957    B. BARENYI    2,784,794
ARRANGEMENT OF THE DRIVE ASSEMBLIES IN AUTOMOTIVE VEHICLES
Filed May 10, 1951    2 Sheets-Sheet 2

INVENTOR
Bela Barenyi

BY  Dicke and Padlon

ATTORNEYS

United States Patent Office 2,784,794
Patented Mar. 12, 1957

2,784,794

ARRANGEMENT OF THE DRIVE ASSEMBLIES IN AUTOMOTIVE VEHICLES

Bela Barenyi, Stuttgart-Rohr, Germany

Application May 10, 1951, Serial No. 225,614

Claims priority, application Germany January 22, 1949

6 Claims. (Cl. 180—57)

The invention relates to the arrangement of the power train and power plant assemblies in automobiles in which these assemblies are arranged in close proximity to one another and to the inner ends of the driven axle shafts; the power plant and the power train assemblies being referred to as drive assemblies hereinafter.

It is the principal object of the invention to provide a novel, compact and space conserving way of arranging the drive assemblies in the automobile and relative to one another.

In previously known drive assembly arrangements of the above referred type, the differential assembly for the two axle shafts was positioned axially between the inner ends of these shafts. This arrangement of the differential made it difficult to suitably and favorably locate the other drive assemblies, for instance, the transmisison which had to be either arranged on top of the differential or, as viewed from the engine, to the rear of the differential or partially to the front and partially to the rear of the differential. Such an arrangement was found to be unsatisfactory in many cases.

According to the invention, the differential is set off to one side of the vertical center plane of the driven axle and is operatively connected to the axle shafts by means of two intermediate shafts and suitable gearing, one each of these two intermediate shafts being positioned on either side of the longitudinal center plane of the vehicle and parallel to this plane. In this arrangement the engine, the transmission and the axle shafts are located substantially in the same plane, the clutch being either located between engine and transmission or, as viewed from the engine, to the rear of the transmission or adjacent to the differential. In the latter case clutch and differential can both be contained in the same housing.

The axle shafts can, for instance, be connected to the two parallel intermediate shafts by means of a suitable type of bevel gears. If the two axle shaft assemblies are pivotally suspended at their inner ends, they are preferably so arranged that their axes of oscillation coincide with the axes of the intermediate shafts.

A further feature of the invention is that the main axis of the drive assemblies formed by the axes of the engine crankshaft and the transmission main shaft can be inclined relative to the horizontal in such a way that it is perpendicular to the pivot or caster line of the wheels. Such an arrangement has the advantage that, on the one hand, road impacts acting on the wheels from the front and longitudinally to the vehicle can be absorbed more easily and that, on the other hand, the design of the axle assemblies is simplified by having their axes of oscillation disposed parallel to the main axis of the drive assemblies, the axes of oscillation of the axle assemblies also coinciding with the axes of the two intermediate shafts in this arrangement.

If the engine is located at the rear of the vehicle, it will be found expedient to place it to the rear of the rear axle, whereas the transmission will be partially located to the front and partially to the rear of the vertical center plane of the rear axle. Such an arrangement of the drive assemblies is particularly favorable and room saving if the overall height of the engine is comparatively low as for instance in a V engine with a large V angle. An inclination of the main axis of the drive assemblies to the horizontal is especially desirable if the inner end wall of the body which faces the drive assemblies has an upward slant towards the rear of the vehicle, as for instance the rear wall of a center section in a vehicle composed of separate center and end sections.

Figure 2:
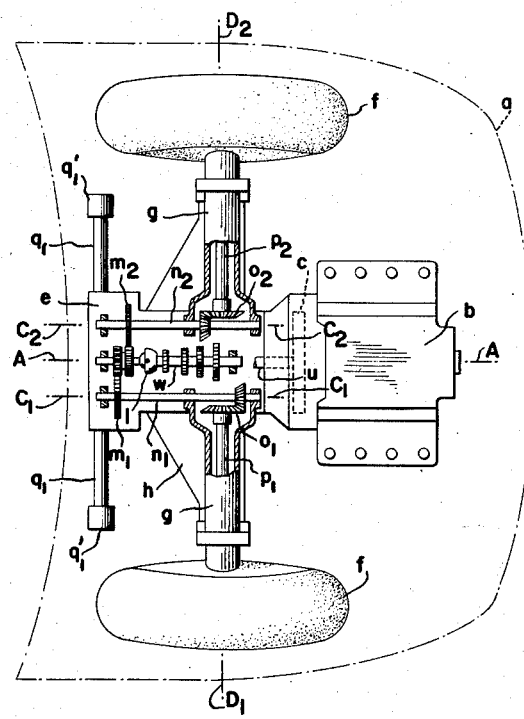
Figure 2:
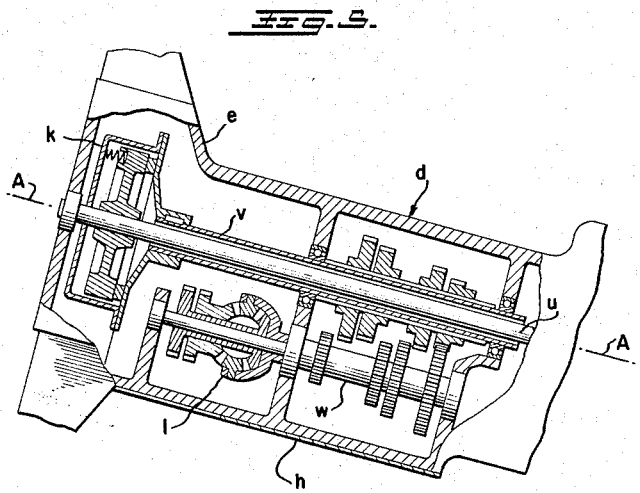
Figure 3:
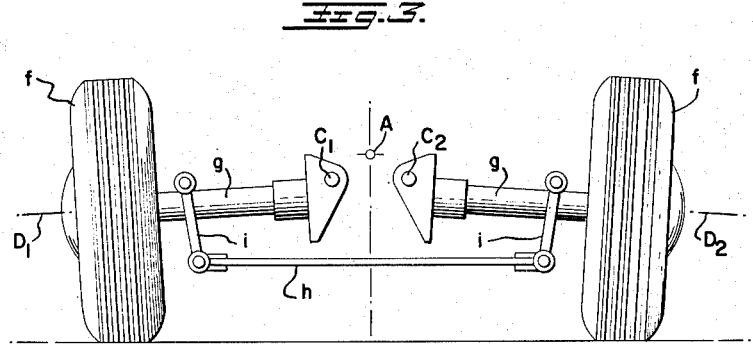
Figure 4:
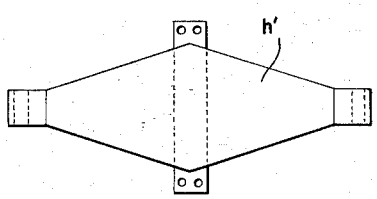

The features of the invention will be apparent from the following description of an example of construction illustrated by the accompanying drawings of which:

Fig. 1 shows a partial side elevational view of a passenger car with the drive assemblies arranged according to the invention, Fig. 2 is a plan view of the arrangement shown in Fig. 1, Fig. 3 is a rear elevational view of the axle arrangement, Fig. 4 is a plan view of a preferred embodiment of a flat spring linked to the two axle assemblies, and Figure 5 is a partial vertical cross sectional view through the transmission, differential and clutch along line A—A of Figure 2.

The vehicle shown is composed of separate sections, the rear section $a$ containing the engine $b$ with the flywheel $c$, the transmission $d$ and the clutch housing $e$. These assemblies form one drive unit which is arranged in such a way that its main axis A—A, i. e., the axis of the engine crankshaft and the transmission main shaft, is inclined downwardly to the rear at an angle $\alpha$ and that the pivot line B—B of the rear wheels is perpendicular to the axis A—A and is inclined to the horizontal or to the road at an angle $\beta$. The wheels $f$ are supported on bearings in the two axle housings $g$ which can oscillate about the axes $C_1$—$C_1$ or $C_2$—$C_2$, these axes of oscillation intersecting the vertical center plane of the two axle housings at points above the axes of rotation of the wheels $f$. This arrangement has the advantage of increasing the stability of the vehicle when being subjected to transverse vibrations or when being driven in curves as well as the further advantage of simplifying the design of the drive train which operationally connects the axle shafts to the drive unit.

The wheels $f$ or the pivotally supported axles $g$ are suspended by spring means which, for instance, may consist of a substantially triangularly-shaped flat leaf spring $h$, as shown in Figures 1 to 3, or preferably of the one-leaf rhomboid shaped flat spring $h'$, as shown in Figure 4, the center part of which may be fastened either to the vehicle body or to the frame or to the drive unit, and the outer ends of this spring being connected to the axles $g$ by means of links $i$ (Figure 3).

The drive of the wheels is effected in the following way: An extension $u$ of the engine crankshaft passes through the transmission $d$ and connects to the clutch $k$ in the clutch housing $e$. The driven member of this clutch is connected to the transmission by means of a hollow clutch shaft $v$ surrounding the crankshaft extension $u$, this hollow clutch shaft extending to the end of the transmission adjacent to the engine. From this end of the transmission the power is transmitted to a countershaft $w$ on which a desired number of countershaft gears is mounted. The countershaft gears can be optionally connected to one of a corresponding number of change speed gears splined to the outer hollow shaft $v$ surrounding the hollow clutch shaft $u$. The outer hollow shaft $v$, which is the transmission main shaft, drives the differential $l$ located within the clutch housing $e$ over the countershaft $w$. The drive of the two intermediate shafts $n_1$ and $n_2$ is taken off the differential by means of the two intermediate gears $m_1$ and $m_2$. The axes of the intermediate shafts coincide with the axes of oscillation $C_1$—$C_1$ or $C_2$—$C_2$ of the two rear axle housings and are operationally connected to the axle shafts $p_1$, $p_2$ by suitable bevel or spiral gearing $o_1$, $o_2$. An oscillatory movement of the axles will therefore not interfere with the drive of the axle shafts $p_1$, $p_2$ by means of the intermediate shafts $n_1$, $n_2$. Arranging the intermediate shafts on both sides of the main shaft permits arranging the transmission $d$ between the inner ends of the axle shafts.

The entire drive unit can be fastened to the front wall $r$ of the rear section $a$ of the vehicle, for instance, by means of two transverse rods or supporting shafts $q_1$ and $q_2$ which are supported near the ends thereof in suitable support members or brackets $q_1'$ and $q_2'$, which brackets in turn are secured to the closure wall $r$ in any conventional manner as by means of welding, bolts, et cetera. Instead of using supporting shafts, a three-point connection may be used to secure the drive unit to the rear wall $r$. The front wall $r$ of the rear section $a$ is preferably of curved or arcuate shape in the manner shown in Fig. 2 and, when viewed as in Fig. 1, is slanting to the rear substantially parallel to the pivot line B—B of the rear wheels. The engine $b$ is preferably a V engine of such a low vertical height that the required road clearance $s$ can be maintained in spite of the inclined position of its axis A—A.

Instead of locating the clutch on the side of the transmission farthest away from the engine, it can also be located in its customary place at the flywheel end of the engine in which case the main transmission shaft will also be of the conventional design.

What I claim is:

1. A drive system for a motor vehicle composed of a plurality of sections including an end section with oppositely located wheels and another section adjacent said end section, each section having an essentially rigid closure wall, two separate transverse shafts for driving said wheels, longitudinal shafts extending on both sides of the longitudinal central plane of the system with the axes thereof above the wheel centers for driving said transverse shafts, a drive unit located in said end section comprising an engine, a transmission, a differential and an engine clutch arranged in the above order in a row between the inner ends of said transverse shafts and formed as a continuous rigid drive block between said longitudinal shafts in said longitudinal central plane, and means for directly securing said drive unit to the essentially rigid closure wall of said end section including at least two transverse supporting shafts supported at said last-mentioned closure wall near the ends of each of said supporting shafts and directly supporting said drive units intermediate said ends.

2. A motor vehicle with a driven axle and a drive unit having a main drive axis and comprising an engine, a clutch, a transmission and a differential arranged on said driven axle of the vehicle, said driven axle consisting of two separate transverse shafts, means for swingably guiding said transverse shafts in an oblique plane non-perpendicular to the plane of the road, said transmission being located between the inner ends of said transverse shafts, said differential being displaced in the longitudinal direction of the vehicle with respect to said oblique plane of swing of said transverse shafts, means including two longitudinal shafts arranged on both sides of the longitudinal central plane of the vehicle for drivingly connecting said two transverse shafts with said differential, said longitudinal shafts being arranged in a direction perpendicular to said oblique plane of swing of said transverse shafts and intersecting said oblique plane of swing above the axis of the transverse shafts whereby the stability of the vehicle when subjected to transverse vibrations or when being driven through curves is increased, and spring means connected to said drive unit for spring supporting said two separate transverse shafts on said drive unit.

3. A motor vehicle according to claim 2, composed of a plurality of sections including at least one center section and an end section, each section having an essentially rigid end wall, said end walls being spaced from one another to define a gap therebetween, wherein said drive unit is located in said end section and wherein said main drive axis in the drive unit slants downwardly toward the rear and is disposed perpendicular to the gap formed between the end walls of the center section and the end section containing the drive unit.

4. A motor vehicle according to claim 2, in which said vehicle includes a body wall closing off the rear of the passenger compartment, said body wall being disposed in parallel to the said oblique plane of swing.

5. A drive system according to claim 2, wherein the engine, transmission, differential and engine clutch are formed as a continuous, rigid drive block arranged between the transverse shafts in the longitudinal central plane.

6. A drive system for a motor vehicle consisting of a plurality of sections including an end section and another section adjacent said end section, said end section and said another section having essentially rigid transverse closure walls near adjacent ends thereof, a driven axle consisting of two separate transverse shafts, a drive unit including an engine, a clutch, a transmission and a differential arranged on said driven axle of said vehicle and formed as a continuous, rigid drive block arranged between said transverse shafts in the longitudinal central plane of the vehicle in said end section, means for swingably guiding said transverse shafts in an oblique plane non-perpendicular to the plane of the road, said transmission being located between the inner ends of said transverse shafts, said differential being displaced in the longitudinal direction of the vehicle with respect to said oblique plane, means including two longitudinal shafts arranged on both sides of said longitudinal central plane for drivingly connecting said two transverse shafts with said differential, said longitudinal shafts being arranged in a direction perpendicular to said oblique plane and intersecting said oblique plane above the axis of said transverse shafts, and means disposed in a plane essentially parallel to the plane of the closure wall of said end section for securing the entire drive block to the closure wall of said end section with the main drive axis of said drive block parallel to said longitudinal shafts including at least two transverse supporting shafts supported near the ends thereof at said last-mentioned closure wall and directly supporting said drive unit intermediate said last-mentioned ends, said closure walls extending upwardly in a direction essentially parallel to said oblique plane.

References Cited in the file of this patent

UNITED STATES PATENTS

| | | |
|---|---|---|
| 410,425 | Matthews | Sept. 3, 1889 |
| 1,223,495 | Kelley | Apr. 24, 1917 |
| 1,903,694 | Burney | Apr. 11, 1933 |
| 2,015,700 | Wagner | Oct. 1, 1935 |
| 2,035,032 | Wagner | Mar. 24, 1936 |
| 2,128,930 | Fageol et al. | Sept. 6, 1938 |
| 2,163,476 | Vincent | June 20, 1939 |

FOREIGN PATENTS

| | | |
|---|---|---|
| 874,196 | France | Apr. 20, 1942 |
| 437,820 | Great Britain | Nov. 6, 1935 |
| 476,100 | Great Britain | Dec. 1, 1937 |

OTHER REFERENCES

Serial No. 368,684, Barenyi et al. (A. P. C.), published May 25, 1943.